United States Patent [19]

Weible

[11] 4,386,734
[45] Jun. 7, 1983

[54] DEVICE FOR OPERATION OF A FLUID CIRCUIT

[75] Inventor: Reinhold Weible, Stuttgart, Fed. Rep. of Germany

[73] Assignee: Sueddeutsche Kuehlerfabrik Julius Fr. Behr GmbH & Co. KG, Stuttgart, Fed. Rep. of Germany

[21] Appl. No.: 200,511

[22] Filed: Oct. 24, 1980

[30] Foreign Application Priority Data

Oct. 25, 1979 [DE] Fed. Rep. of Germany ....... 2943064

[51] Int. Cl.³ .............................................. F28F 13/06
[52] U.S. Cl. ................................ 237/12.3 B; 165/96; 165/176
[58] Field of Search .................. 237/12.3 B; 165/108, 165/176, 103, 96, 100

[56] References Cited

U.S. PATENT DOCUMENTS

| | | | |
|---|---|---|---|
| 1,782,380 | 11/1930 | Daley | 165/176 |
| 2,749,049 | 6/1956 | Smith | 237/12.3 B |
| 3,779,307 | 12/1973 | Weiss et al. | 237/12.3 B |
| 3,830,293 | 8/1974 | Bell | 165/108 |
| 4,058,255 | 11/1977 | Linder et al. | |
| 4,206,802 | 6/1980 | Reed et al. | 165/176 X |
| 4,279,291 | 7/1981 | Lambert | 165/108 X |

FOREIGN PATENT DOCUMENTS 2357497 5/1975 Fed. Rep. of Germany ... 237/12.3 B

Primary Examiner—Sheldon J. Richter
Attorney, Agent, or Firm—Schwartz, Jeffery, Schwaab, Mack, Blumenthal & Koch

[57] ABSTRACT

Disclosed is a fluid circuit, comprising a fluid outlet; a primary fluid flow line having a first section coupled with the fluid inlet and a second section coupled with the fluid outlet; an on-off type control valve and a heat exchanger located in the primary fluid flow line; a bypass fluid flow line connected in parallel to the heat exchanger to provide fluid flow between the first and second sections bypassing the heat exchanger; and a valve positioned in the bypass line for permitting fluid flow in the bypass line in the direction of the fluid inlet. Also disclosed is an automotive vehicle heating and cooling system containing the fluid circuit as the vehicle interior compartment heating system.

11 Claims, 12 Drawing Figures

——— WITH BYPASS
– – – WITHOUT BYPASS 4,386,734

DEVICE FOR OPERATION OF A FLUID CIRCUIT

BACKGROUND OF THE INVENTION

The present invention pertains to a device for operation of a fluid circuit comprising a principal line and at least a heat exchanger and a cycled control valve for regulation of fluid flow. The fluid circuit is preferably a heating circuit in a vehicle.

It is known to provide in the heating circuit for an automotive vehicle a cycled control valve for regulation of the flow volume of the heating fluid, i.e., for control of the heat output of the heat exchanger. (See, e.g., DE-OS No. 25 31 015 and DE-OS No. 26 15 476) Such a control valve is operated with only two control positions, i.e., either "open" with the cross section of the valve completely open, or "closed" with a completely closed cross sectional area. The changeover from one valve setting to the other takes place in a very short time, so that a strong deceleration of the moving fluid mass occurs. These decelerated fluid masses lead to peaks of overpressure in front of the closed valve, and this has a detrimental effect on the entire fluid circuit and may lead to the destruction of tubing, hoses, connecting pieces, etc. In the direction of the flow behind the closed valve, peaks of low pressure occur, which among other consequences lead to vapor separation and the formation of vapor bubbles in the heating medium, thus effecting a non-uniform contact with the heat exchanger located downstream in the heater device. Furthermore, the flow control of the heating fluid in the case of low and medium heat outputs basically results in an unfavorable temperature distribution in the heat exchanger. The heat exchanger of the heater is heavily supersaturated on the air side, and the average flow velocity of the heating fluid is low. On its way from the inlet of the heat exchanger through the heat exchanger to the outlet of the heat exchanger, the heating fluid is thereby cooled almost entirely at the onset of this path, so that during the remaining portion of the path practically no heat exchange and thus no heating of the air takes place. As a result, strong temperature gradients are also produced in the air flow. Such a layer-like variability of the temperature of the heated air flow is undesirable for a comfortable regulation of the heating, on the one hand, because the passengers in the vehicle are exposed to differently heated air, and on the other, because it is technically not possible to detect the representative air outlet temperature downstream of the heat exchanger with a single sensor, or at least this is possible only at a considerable expense.

Various measures have been proposed to avoid a layered temperature distribution. For example, it is disclosed in DE-OS No. 23 10 709 to insert a bypass line in a heating circuit for a vehicle in combination with a pump, whereby the regulation of the flow of the heating medium in the principal line is effected by means of a continuously variable control valve, and the control of the flow in the bypass line is regulated by means of a suitably dimensioned diaphragm in combination with the pump between the bypass and the heat exchanger. One disadvantage of this proposed measure is that an additional device in the form of a pump to increase the pressure is required to maintain a bypass flow and hence the intermixing of cooled heating medium. Since this heating circuit operates with a continuously regulated volume control valve, the problem of pressure impacts does not arise in the fluid circuit.

BACKGROUND OF THE INVENTION

It is therefore an object of the present invention to provide an improved fluid circuit.

It is also an object of the invention to provide an improved device for the operation of a fluid circuit of the basic type described above.

It is also an object of the invention to provide an improved automotive heating and cooling circuit containing the improved fluid circuit according to the invention.

A further object of the invention resides in providing such a device wherein, on the one hand, the pressure impacts occurring as the result of sequential control are reduced, and on the other, a more uniform temperature distribution on the heat exchanger is made possible.

In accomplishing the foregoing objects, there has been provided according to the present invention a fluid circuit, comprising a heat exchanger having a fluid inlet and a fluid outlet; a primary fluid flow line having a first section coupled with the fluid inlet and a second section coupled with the fluid outlet; an on-off type control valve located in the primary fluid flow line to control the flow of fluid through the heat exchanger; a bypass fluid flow line connected in parallel to the heat exchanger to provide fluid flow between the first and second sections bypassing the heat exchanger; and a valve positioned in the bypass line for permitting fluid flow in the bypass line in the direction of the fluid inlet. Preferably, the bypass line valve comprises a one-way valve which permits fluid flow only in the direction of the fluid inlet.

There has also been provided in accordance with the present invention an automotive vehicle heating and cooling system for circulating a fluid heat exchange medium, comprising an engine; a radiator for cooling the fluid heat exchange medium by contact with ambient air; a fluid transport system for circulating the heat transfer medium between the engine and the radiator; and a fluid circuit connected to the fluid transport system, for circulating the heat transfer medium to an interior compartment of the vehicle, wherein the fluid circuit comprises the fluid circuit defined above.

Further objects, features and advantages of the present invention will become apparent from the following detailed description of preferred embodiments, when considered together with the attached figures of drawing.

BRIEF DESCRIPTION OF THE DRAWINGS

Exemplary embodiments of the invention are illustrated in the drawings and are described hereinafter in more detail.

Figure 1:
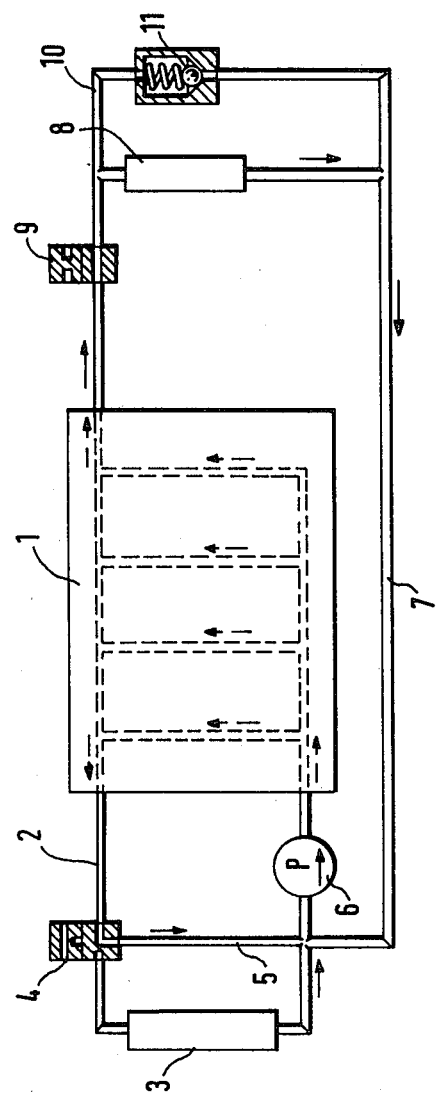
Figure 2:
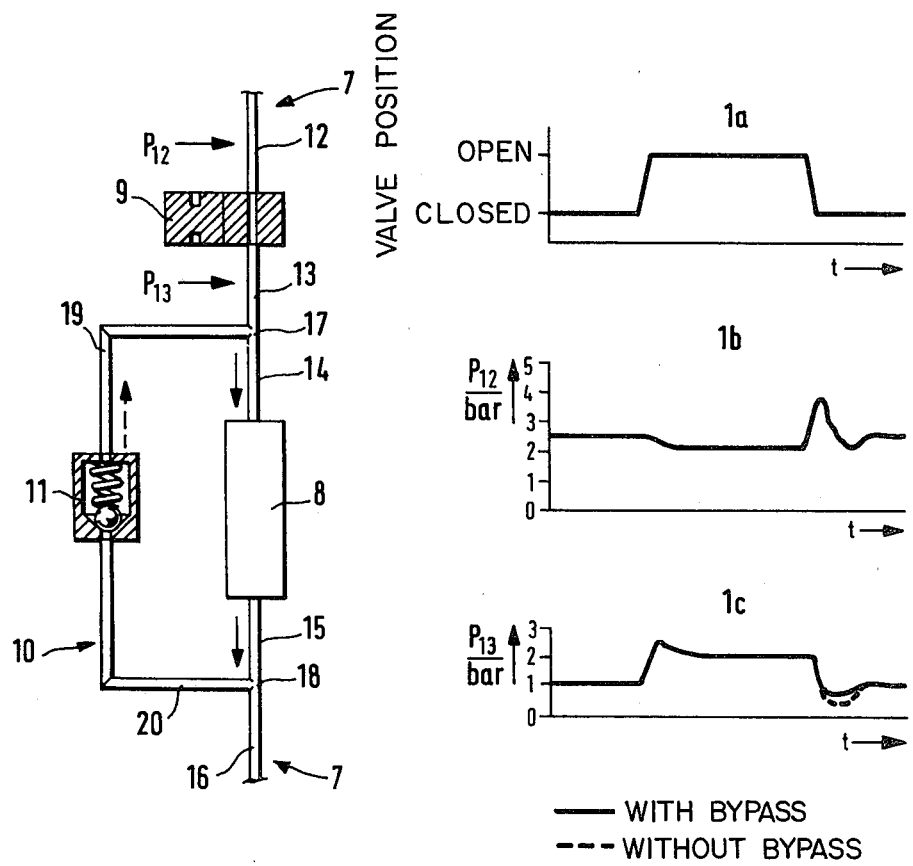
Figure 3:
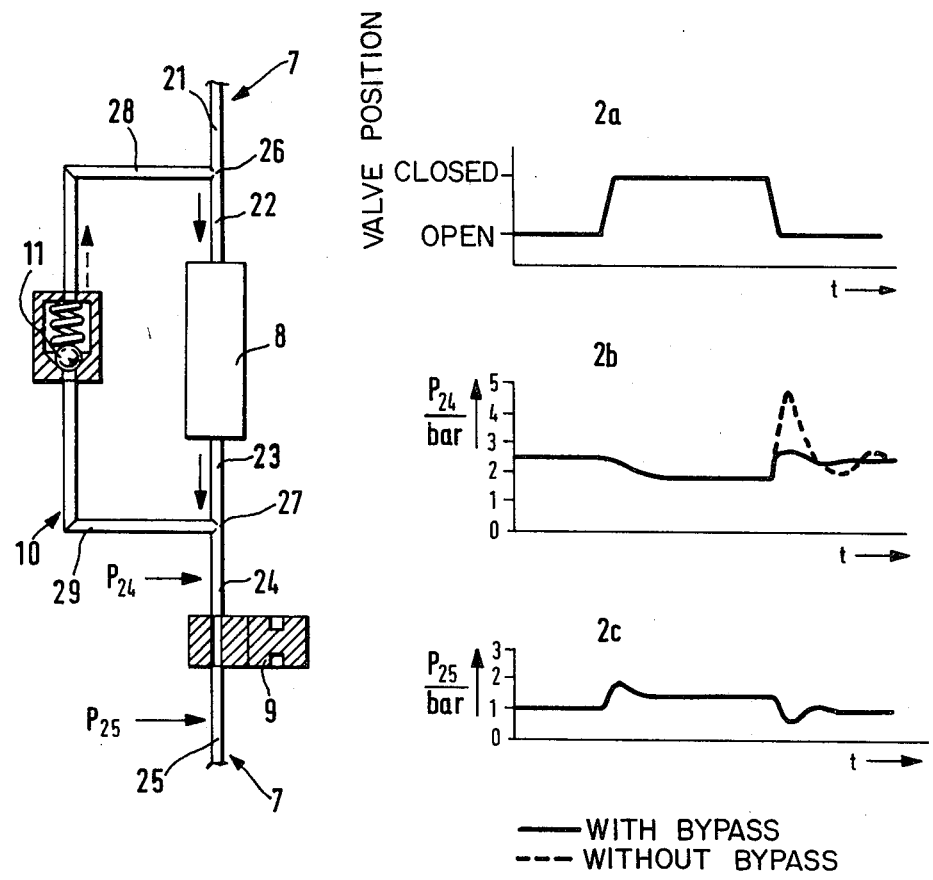
Figure 4:
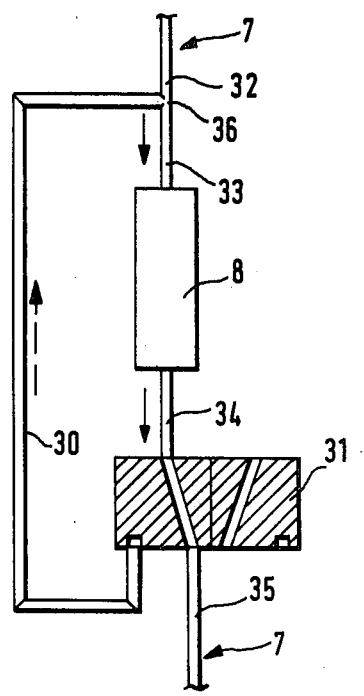
Figure 5:
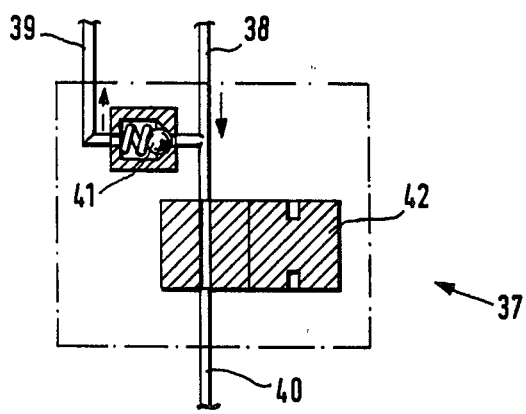

IN THE DRAWINGS:

FIG. 1 is a schematic diagram of a cooling and heating circuit for an internal combustion engine;

FIG. 2 is a schematic diagram of a heat exchanger with a bypass and a control valve arranged upstream, together with diagrams a, b and c illustrating operation of the system;

FIG. 3 is a schematic diagram similar to FIG. 2 for a heat exchanger and a bypass with a control valve arranged downstream;

FIG. 4 is a schematic diagram of a heat exchanger and bypass with a two-way valve;

FIG. 5 is a schematic diagram of an integrated no-return control valve; and

Figure 6:
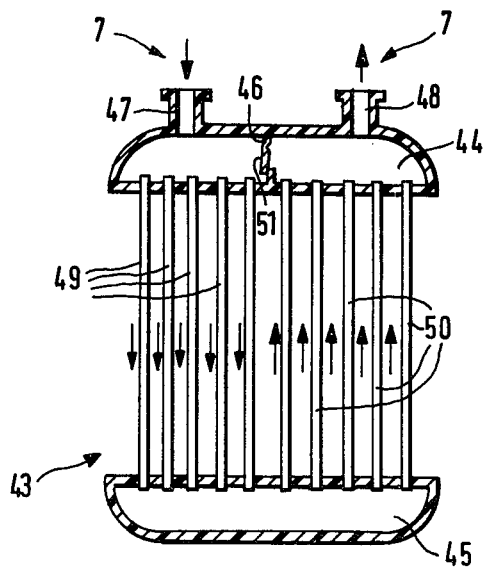

FIG. 6 is a schematic diagram of a heat exchanger with a no-return valve built into the partition of said heat exchanger.

DETAILED DESCRIPTION OF PREFERRED EMBODIMENTS

In the bypass according to the invention, because of the type of valve provided, a bypass flow is possible whenever the control valve in the principal line is closed. The mass of the fluid still in motion after closing the control valve is capable of inducing in the bypass a secondary flow, which is combined with the principal flow into a circuit flow. In this manner, strong decelerations and the pressure impacts associated therewith are prevented, and the principal flow is allowed to subside slowly by way of the bypass, i.e., it is gently braked depending on the flow resistance in the bypass. Beyond this, the secondary flow induced in this manner effects a reflux of heating medium already cooled in the heat exchanger and its mixing into the flow in advance of the heat exchanger, so that a uniform temperature distribution is established in the heat exchanger. The flow of the fluid in the heat exchanger is thus not interrupted, but is maintained whenever the control valve of the principal line is closed. The result is a higher flow velocity, together with a lower inlet temperature in the heat exchanger and consequently a smaller temperature gradient in the direction of the flow. This simplifies the control technology for detection of the representative air outlet temperature at the heat exchanger with a single sensor. Furthermore, the bypass according to the invention, together with the valve, is readily installed in existing devices.

According to a preferred embodiment, there is provided in the bypass a one-way valve which opens automatically upon closing of the valve in the principal line and makes possible a secondary flow directed toward the inlet of the heat exchanger. The advantage of this valve configuration resides in its simplicity and in its automatic operation.

In a further advantageous embodiment of the invention, the control valve and the valve in the bypass are integrated into a two-way valve. Thereby one valve is saved, and the bypass control is effected in an actuated rather than an automatic manner.

In another advantageous development of the invention according to the invention, the one-way valve is provided in a partition of the header or manifold container of a heating body. The advantage of this embodiment consists of the fact that the entire bypass together with the valve is integrated into the heater body, and thus, certain lines are eliminated.

According to another advantageous embodiment according to the invention, the control valve or the two-way valve, respectively, is located upstream of the heat exchanger and the bypass. The advantage of this arrangement resides in the fact that the low pressure peaks downstream of the control or the two-way valve, respectively, are reduced (after the valve is closed) by the increasing secondary flow. In this manner, the separation of gases and the formation of vapor bubbles are prevented.

According to a still further advantageous variant in keeping with the invention, the control or the two-way valve, respectively, is located downstream from the heat exchanger and the bypass. The advantage of this arrangement consists of the fact that the overpressure impacts appearing upstream of the control or the two-way valve, respectively, (again after closure), are effectively damped by the circuit flow building up upstream of the control or two-way valve. This results because the kinetic energy of the flowing mass of the fluid is consumed by the flow resistance in the closed circuit consisting of the bypass and the section of the principal line.

According to another advantageous embodiment of the invention, the one-way valve and the control valve are integrated in a structural unit so that the advantage of structural simplifications is obtained.

Finally, in a still further advantageous embodiment of the invention, the bypass may be integrated as a tube or conduit in the heat exchanger. This results in the advantage that a separate line segment for the bypass is not required.

FIG. 1 illustrates schematically an internal combustion engine 1, having a conventional cooling water circuit 2 with a radiator 3, a thermostat valve 4, short circuit line 5 and cooling water pump 6 attached thereto. A heater circuit 7 is arranged parallel to this cooling water circuit 2, containing for regulation of the flow volume an on-off type control valve 9 and a heat exchanger 8 for heating of the interior space of the vehicle. The latter is usually provided in the form of a finned tube exchanger, through which the heating medium flows in one or several directions on the primary side and which is exposed to air on the secondary side. The air is conducted after heating into the interior space of the vehicle. In the case of the automatic heat output control, a sensor is placed in this flow of air to measure the outlet temperature of the air. According to the invention, parallel to the heat exchanger 8, a bypass 10 with a one-way valve 11 is installed, wherein the one-way valve 11 opens against the direction of principal flow in the heating circuit 7, i.e., toward the inlet of the heat exchanger.

FIG. 2 illustrates a section of the heating circuit 7, specifically the upstream arrangement of the cycled control valve 9 with respect to the heat exchanger 8 having the bypass 10 and the one-way valve 11. In this arrangement, the heating medium coming from the engine initially flows through the line section 12 and then through the cycled control valve 9, which has two valve positions, i.e., "open" or "closed". With the valve 9 open, as shown in the drawing, the heating medium then passes through the subsequent line sections 13 and 14 into the heat exchanger 8 and exits from the latter through the line sections 15 and 16. The direction of the principal flow of the heating medium is characterized by the solid arrows. Parallel to the principal line or parallel to the heat exchanger 8, the bypass 10 is connected by means of the two connections 17 and 18. The bypass consists of the two line segments 19 and 20, and the one-way valve 11. The latter opens in the direction of the inlet of the heat exchanger, so that a secondary flow in the direction of the arrow indicated by a broken line in the drawing may be formed.

The functioning of this arrangement with the control valve placed upstream of the heat exchanger will now be explained with the aid of the diagrams 1a to 1c. Diagram 1a shows the two possible valve positions, i.e., "open" and "closed", in other words, a so-called cycle control is provided and not a throttling control with a continuously variable flow cross section. Diagrams 1b and 1c show the variable of pressure in front of and behind the cycling control valve 9, both in the case of an open and a closed valve. In the case of an open valve, the pressure is essentially the same in the line segments 12 (in front of the valve 9) and 13 (behind the valve 9), and the one-way valve 11 in the bypass 10 is closed, so that the volume of the flow through the valve 9 is equal to the volume flow through the heat exchanger.

If the valve 9 is closed, the fluid mass in motion during the open phase is strongly decelerated by the abrupt closing of the valve, both in front of and behind the valve 9. The strong deceleration of the flow in front of the valve leads to a damming up and—as shown in diagram 1b—to a pressure peak in the line segment 12 and thus in the entire inlet line of the heating circuit 7. Behind the valve 9, a reduced pressure is established in line segments 13 and 14 following the abrupt closing of the valve which leads to the opening of the one-way valve 11 and resulting secondary flow in the bypass 10. The cooled heating medium then flows in the reverse direction and leaves the heat exchanger 8 through the line segment 15, in order to enter the bypass 10 at the connection 18 and through the line segment 20. The cooled heating medium then flows by way of the open one-way valve and through the line segment 19 and the connection 17 back into the principal conduit 14 and then into the heat exchanger 8.

This circulation in the bypass line segments 19 and 20 and in the segments 14 and 15 of the principal conduit together with the heat exchanger 8 creates closed circulation, which firstly leads to a reduction of the inlet temperature of the heating medium in the heat exchanger and secondly to an increase in the volume of fluid flowing through the heat exchanger. Both measures produce a more uniform temperature distribution on the heat exchanger, i.e., a reduced temperature gradient in the flow direction of the heating medium. The alternation of the low pressure peak which would appear in a heating circuit without a bypass is shown in diagram 1c, wherein the solid line indicates the variation of the pressure in the line segment 13, i.e., behind the control valve, while the broken line represents, as a comparison, the pressure variation without the bypass 10 and the one-way valve 11. The bypass 10 arranged downstream from the control valve 9 prevents the development of this low pressure peak, because the one-way valve 11 opens immediately, thus producing an equalization of pressure by way of the secondary flow. Following this equalization of the pressure, the secondary or circulation flow ceases, and when the control valve 9 opens, the one-way valve 11 is closed by the slightly rising pressure in the principal flow path.

FIG. 3 again shows a section of the heating circuit 7, wherein the heat exchanger 8 and the bypass 10 with the one-way valve 11 are arranged upstream of the control valve 9. The principal flow of the heating medium in this case, coming from the engine, enters the heat exchanger 8 by way of the line segments 21 and 22, and from there arrives at the cycled control valve 9 through the line segments 23 and 24. From control valve 9, the heating medium enters the return branch of the heating circuit 7 through the line segment 25. The bypass 10 consisting of the line segments 28 and 29 and the one-way valve 11, is connected at 26 and 27 with the principal conduit in parallel to the heat exchanger 8.

The pressure variation for the flow in line segment 24, i.e., in front of the control valve 9, and in line segment 25, i.e., downstream of the control valve 9, is shown in the diagrams 2b and 2c. The drawing shows the control valve 9 in the open position, whereby according to diagrams 2b and 2c an essentially identical pressure variation is created in front of and behind the valve 9. If the control valve 9—as shown in diagram 2a—is closed abruptly, the fluid flow undergoes a deceleration which without the use of a bypass having a one-way valve would lead to a pressure peak in front of the closed control valve 9, i.e., in line segment 24. Such a pressure peak is represented in diagram 2b by means of a broken line. With the arrangement of the bypass 10 having the one-way valve 11 according to the invention, such a pressure peak cannot appear, as it is immediately reduced by opening of the one-way valve 11, as a result of the secondary flow indicated by the arrow drawn with a broken line. This secondary flow is completed by flow in segments 22 and 23 of the principal line and in the heat exchanger 8, to form a circuit which gradually subsides as a result of the existing flow resistances.

The effects of this circuit are essentially the same as those recited in the preceding description of FIG. 2. The effective difference between the arrangement according to FIG. 2 and that of FIG. 3 consists of the fact that, in the latter, the pressure peak appearing in front of the control valve is reduced, while the low pressure peak of lesser magnitude behind the control valve 9 remains unchanged. It is possible, however, to provide a further bypass with a one-way valve downstream of the control valve 9, in order to eliminate this low pressure peak. The same is analogously true for the embodiment according to FIG. 2, wherein another bypass may be inserted upstream of the control valve 9 to reduce the overpressure peak developing at that location.

FIG. 4 illustrates a further development of the invention, wherein the one-way valve 11 described in connection with the preceding figures is integrated into a single structural unit with the cycled control valve 9 and is designed as the two-way valve 31. The figure again shows a section of the heating circuit 7, which here consists of the segments 32, 33, 34 and 35 of the principal conduit, with the heat exchanger 8 arranged between segments 33 and 34, and the two-way valve 31 located downstream from said heat exchanger. The third connection of the two-way valve 31 is joined to the bypass 30, which in turn is connected with the principal conduit upstream of the heat exchanger at the connection 36. This two-way valve 31 may also be cyclically controlled and establishes either a connection between segment 34 of the principal conduit and bypass 30, while simultaneously closing the segment 35 or alternatively a connection between the segments 34 and 35 of the principal conduit whereby in the latter case the bypass 30 is closed off.

By means of the two-way valve 31, the opening and closing of the bypass 30 is achieved positively (in contrast to the automatic opening and closing in the case of a one-way valve) and synchronously with the opening and closing process in the principal conduit of the heating circuit 7. In principle, however, the same secondary or circulation flow is developed in the bypass 30 and also in the principal conduit and the heat exchanger, so that the same advantages as in the preceding embodiments are obtained. The two-way valve 31 may further be arranged upstream of the heat exchanger 8—in a manner analogous to FIG. 2—so that the connection 36 in FIG. 4 is replaced by the two-way valve. In the downstream arrangement of the two-way valve 31, overpressure peaks are reduced by means of the bypass 30, while in an upstream arrangement of the valve 31, low pressure peaks are equalized when the principal conduit is closed.

FIG. 5 illustrates an integrated structural unit 37, wherein the one-way valve 41 for the bypass is combined with the control valve 42 of the principal conduit. Three connections are provided on this integrated valve, i.e., the connecting fittings 38 and 40 for the principal conduit and the fitting 39 for the bypass. The fittings 38, 39 and 40 are interconnected within the valve by means of line segments or bores, which are shown in the drawing as continuous system lines.

FIG. 6 illustrates still another embodiment of the invention, wherein the bypass and the one-way valve are placed or integrated in a heat exchanger. This heat exchanger 43 consists of two header compartments 44 and 45, enclosing a bundle of tubes 49, 50 between them. The heating medium, coming from the inlet line of the heating circuit 7, enters the upper header compartment 44 through the inlet fitting 47 and initially flows through the tubes 40 in the downward direction, until diverted in the lower header compartment 45, and then flows upwardly through the tubes 50. It leaves the heat exchanger 43 through the outlet fitting 48. The upper header compartment 44 has a partition 46, in which a one-way valve 51 is installed according to the invention. The one-way valve 51 opens toward the inlet fitting 47.

When the control valve (not shown) located upstream or downstream of the heat exchanger 43 is closed, the one-way valve 51 opens and the low pressure or overpressure peak, as the case may be, is reduced, because in the upper header compartment 44 a bypass flow is developed from the outlet 48 to the inlet fitting 47. This bypass flow then combines with the principal flow in the tubes 49 and 50 into a circulation flow. In this embodiment of the invention, a separate bypass with the necessary lines is eliminated. Furthermore, in the case of a header compartment 44 made of a synthetic plastic material, the one-way valve can be designed in a very simple and inexpensive manner as a flap or check valve made of a similar material.

To minimize the remaining pressure peaks in segments of the principal conduit which are not connected in parallel with the bypass, it is of advantage to keep the principal conduit segments as short as possible, whereby the segment lengths of the principal conduit upstream and downstream of the heat exchanger which are connected in parallel with the bypass, are increased. This is particularly favorable in the case of vehicles in which long heating circuits are necessitated by the type of the vehicle, for example, buses.

What is claimed is:

1. A fluid circuit, comprising:
a heat exchanger having a fluid inlet and a fluid outlet;
a primary fluid flow line having a first section coupled with said fluid inlet and a second section coupled with said fluid outlet;
means, including an on-off control valve located in said primary fluid flow line, for abruptly terminating the flow of fluid through said heat exchanger upon closure of said control valve, whereby pressure peaks are produced in said primary fluid flow line and in said heat exchanger in response to abrupt termination of the fluid flow;
a bypass fluid flow line connected in parallel to said heat exchanger to provide fluid between said first and second sections bypassing said heat exchanger; and
means, including a valve positioned in said bypass line, for selectively permitting fluid flow in said bypass line in the direction of said fluid inlet only in response to closure of said control valve, whereby said pressure peaks are dissipated by the fluid flow in said bypass line.

2. A fluid circuit as defined in claim 1, wherein said bypass line valve comprises a one-way valve which permits fluid flow only in the direction of said fluid inlet.

3. A fluid circuit as defined in claim 1, wherein said on-off type control valve and said bypass line valve are integrated into a single valve housing to define a two-way valve having first and second positions, whereby in said first position said primary fluid flow line is open and said bypass line is closed and in said second position said bypass line is open and said primary fluid flow line is closed.

4. A fluid circuit as defined in claim 1, wherein said heat exchanger comprises a header compartment having a separating wall therein separating said compartment into an inlet sub-compartment communicating with said fluid inlet and an outlet sub-compartment communicating with said fluid outlet, and wherein said bypass line valve is contained in said separating wall to define said bypass fluid flow line.

5. A fluid circuit as defined by claim 1, 2, 3 or 4, wherein said on-off type control valve is positioned upstream of said heat exchanger and said bypass line.

6. A fluid circuit as defined by claim 1, 2, 3 or 4, wherein said on-off type control valve is positioned downstream of said heat exchanger and said bypass line.

7. A fluid circuit as defined by claim 2, wherein said one-way valve and said on-off type valve are integrated into a single valve housing having three connections for fluid flow lines.

8. A fluid circuit as defined by claim 1 or 2, wherein said bypass fluid flow line comprises a passage integrated as a structural element within said heat exchanger.

9. An automobile vehicle heating and cooling system for circulating a fluid heat exchange medium, comprising:
an engine;
a radiator for cooling the fluid heat exchange medium by contact with ambient air;
a fluid transport system for circulating the heat transfer medium between said engine and said radiator; and
a fluid circuit connected to said fluid transport system, for circulating the heat transfer medium to an interior compartment of the vehicle, wherein said fluid circuit comprises the fluid circuit as defined by claim 1.

10. A fluid circuit, comprising:
a heat exchanger having a fluid inlet and a fluid outlet;
a primary fluid flow line having a first section coupled with said fluid inlet and a second section coupled with said fluid outlet;
an on-off type control valve located in said primary fluid flow line to control the flow of fluid through said heat exchanger;
a bypass fluid flow line connected in parallel to said heat exchanger to provide fluid flow between said first and second sections bypassing said heat exchanger; and a valve positioned in said bypass line, said valve permitting fluid flow in said bypass line in the direction of said fluid inlet, wherein said on-off type control valve and said bypass line valve are integrated into a single valve housing to define a two-way valve having first and second positions, whereby in said first position said primary fluid flow line is open and said bypass line is closed and in said second position said bypass line is open and said primary fluid flow line is closed.

11. A fluid circuit, comprising:

a heat exchanger having a fluid inlet and a fluid outlet;

a primary fluid flow line having a first section coupled with said fluid inlet and a second section coupled with said fluid outlet;

an on-off type control valve located in said primary flow line to control the flow of fluid through said heat exchanger;

a bypass fluid flow line connected in parallel to said heat exchanger to provide fluid flow between said first and second sections bypassing said heat exchanger; and a valve positioned in said bypass line, said valve permitting fluid flow in said bypass line in the direction of said fluid inlet, wherein said bypass line valve comprises a one-way valve which permits fluid flow only in the direction of said fluid inlet, and wherein said one-way valve and said on-off type valve are integrated into a single valve housing having three connections for fluid flow lines.

* * * * *